Patented June 27, 1933

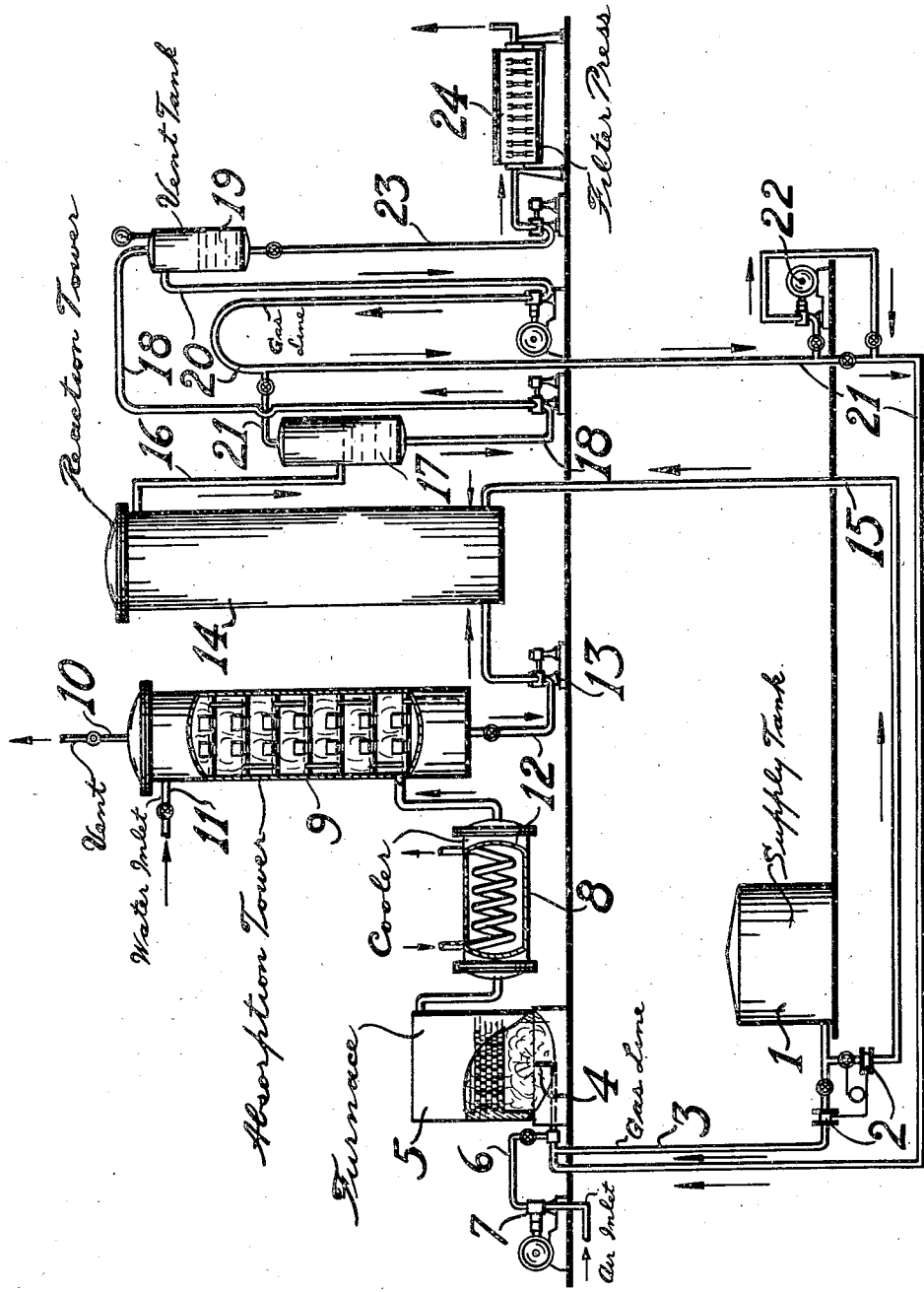

1,915,364

UNITED STATES PATENT OFFICE

JOSEPH W. HARRELL, OF BAYTOWN, TEXAS, ASSIGNOR TO STANDARD OIL DEVELOPMENT COMPANY, A CORPORATION OF DELAWARE

TREATING HYDROGEN-SULPHIDE CONTAINING GASES

Application filed July 23, 1932. Serial No. 624,273.

The present invention relates to a process for treating hydrogen sulphide containing gases and will be understood from the following description when read in conjunction with the drawing the sole figure of which is a vertical section through the apparatus used in carrying out the invention.

The main object of the invention is to react the hydrogen sulphide containing gas with the sulphur dioxide in the presence of water, carrying out the process in such a way that no hydrogen sulphide escapes into the air. This is achieved by recirculating the residual gas obtained in the reaction of the hydrogen sulphide and sulphur dioxide to the burner to which the sulphur dioxide containing gas is generated. The process is also characterized by the presence of an excess of hydrogen sulphide during its reaction with sulphur dioxide whereby the occurrence of side reactions is minimized and the maximum amount of sulphur is recoved from the reaction.

Referring now to the drawing, the numeral 1 designates a container such as a tank for the hydrogen sulphide containing gas, 2 is a ratio of flow controller, 3 a gas line to the burner 4 arranged in a furnace 5, and 6 is an air line with an air compressor 7. The numeral 8 designates a cooler, 9 an absorption tower, which may be provided with bell cap plates. The tower has a vent line 10, a line 11 for the introduction of water and a line 12 for the removal of the sulphur dioxide charged water. A pump 13 may be provided in line 12 which discharges into the reaction tower 14. This has a gas line 15 connecteed with the ratio of flow controller 2, and a fluid discharge line 16 leading to a gas separator 17. Liquid line 18 connects the separator 17 with the vent tank 19 which serves for freeing the water from the absorbed hydrogen sulphide and may be held under vacuum. Gas line 20 discharges into line 21 which connects the upper part of separator 17 with the burner 4. A compressor 22 is provided in line 21. Liquid line 23 connects the lower part of vent tank 19 with a filter press 24.

The process is carried out in the following manner:

Part of the hydrogen sulphide-containing gas is passed from tank 1 through line 3 to the burner 4 and burned in the furnace 5, preferably with say 25% of excess air. The combustion gases leaving the furnace at the elevated temperature of say 1,800° F. are cooled in cooler 8 to about 120° F. or below and discharge into the lower portion of the absorber 9. Herein the combustion gas is freed from the sulphur dioxide by washing with water which is preferably introduced at the upper part of the tower through line 11 and passes counter-currently to the gas. The tower is so dimensioned that the residual combustion gas which leaves through vent line 10 contains only a small amount of unabsorbed sulphur dioxide. The solution of sulphur dioxide in water is then picked up by pump 13 and forced through line 12 to the lower portion of reaction tower 14. A portion of the hydrogen sulphide containing gas passes from tank 1 through the ratio of flow controller 2 and line 15 directly to the reaction tower 14 wherein it reacts with the absorbed sulphur dioxide according to the following formula:

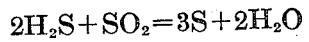

$$2H_2S + SO_2 = 3S + 2H_2O$$

The aqueous solution of sulphur dioxide and the hydrogen sulphide containing gas may be passed either countercurrently or concurrently through the reaction tower. A concurrent flow is preferred in the present process. In order to eliminate side reactions and the loss of sulphur connected therewith an excess of hydrogen sulphide over that required for the reaction with the sulphur dioxide is maintained. The reaction mixture containing water carrying elementary sulphur and the residnal gas passes through line 16 into the gas separator 17 and hence into vent tank 19. The residual gas still contains hydrogen sulphide since an excess thereof was maintained in the tower 14 and, therefore, this gas is returned through lines 20 and 21 to the burner 4 by means of booster 21 for the purpose of oxidizing it in furnace 5 to sulphur dioxide. The water containing the elementary sulphur in suspension is removed from 19 through line 23 and its sulphur content is recovered by any of the known means such as for example by passing the liquid through filter press 24.

It is seen that only residual combustion gases containing a small amount of sulphur dioxide escape into the air through vent line 10 but no hydrogen sulphide-containing gas leaves the apparatus so that the pollution of the air with hydrogen sulphide is entirely eliminated.

The process is most advantageously employed for the treatment of gases rich in hydrogen sulphide and preferably of gases containing 70% or more of hydrogen sulphide. The process may be carried out under atmospheric pressure or even under vacuum but the best operating conditions are realized when the gas in tank 1 is kept under pressure, e. g. under 5–30 lbs., gauge pressure, and the furnace 5, cooler 8 and absorption tower 9 are held under just a slightly lower pressure. The reaction tower 14 may be held under higher pressure in which case the booster 21 may be omitted or the pressure in tank 1, furnace 5 and absorption tower 9 may be higher than in reaction tower 14 in which case the booster 21 will be used for the return of residual gas.

The following example will illustrate the process:

A gas containing 90% of $H_2S$ and 10% of $CO_2$ is passed through ratio of flow controller to the furnace and to the reaction tower in the proportion of 41 to 71. The part passing through the furnace is burned therein with 25% of excess air, cooled and then contacted in tower 9 with so much water that a 1% by weight of solution of $SO_2$ is obtained. The sulphur is separated from the water after reaction and the residual gas is returned to the burner. When 100,000 cubic feet of the gas weighing 9,250 pounds are processed the amount of water passed to the absorber is 492,000 pounds. The total sulphur content of the raw gas is 7,610 pounds, of which 7,490 pounds are recovered the rest escaping into the air in the form of sulphur dioxide. The gas compositions are the following:

*Raw gas*

| | Percent by volume |
|---|---|
| $H_2S$ | 90 |
| $CO_2$ | 10 |

*Combustion gas*

| | Percent by volume |
|---|---|
| $H_2O$ | 10.25 |
| $SO_2$ | 10.25 |
| $CO_2$ | 3.31 |
| $O_2$ | 3.81 |
| $N_2$ | 72.35 |

*Gas leaving absorber*

| | Percent by volume |
|---|---|
| $H_2O$ | 4.45 |
| $SO_2$ | 0.61 |
| $CO_2$ | 3.95 |
| $O_2$ | 4.60 |
| $N_2$ | 86.39 |

*Gas to burner*

| | Percent by volume |
|---|---|
| $H_2S$ | 75.6 |
| $CO_2$ | 24.4 |

It will be understood that the process may be varied in different ways. Thus, for example, the water leaving filter press 24 and freed from sulphur may be returned to line 11 of absorption tower 9. Furthermore, the total hydrogen sulphide-containing raw gas may be passed to reaction tower 14 and the sulphur dioxide-containing gas necessary for the reaction may be generated by burning part of the sulphur produced in a rotary burner. It will be, however, understood that the residual gas obtained after the reaction in tower 14 is in every case returned to the burner or furnace in which the $SO_2$ containing gas is generated.

Other changes and modifications may be made and the invention is not to be limited by any particular details but only by the appended claims in which it is my intention to claim all novelty inherent in the process.

What I claim is:

1. The process of treating a gas rich in hydrogen sulphide, which comprises generating a sulphur dioxide containing gas by combustion of sulphur containing material, cooling the combustion gas and passing it into an absorption zone in contact with water to obtain an aqueous solution of sulphur dioxide, passing the gas rich in hydrogen sulphide into a reaction zone in contact with aqueous sulphur dioxide solution, maintaining an excess of hydrogen sulphide in said reaction zone, separating the residual gas and the aqueous slurry from the reaction mixture obtained in the reaction zone and returning the residual gas to the combustion zone.

2. Process according to claim 1 in which a gas containing over 70% by volume of hydrogen sulphide is treated.

3. The process of treating a gas rich in hydrogen sulphide, which comprises passing part of the gas to a combustion zone and burning it with excess air, cooling the combustion gas and absorbing therefrom sulphur dioxide by contact with water to obtain an aqueous sulphur dioxide solution, transferring the solution into a reaction zone, passing the remainder of said gas rich in hydrogen sulphide to the reaction zone to obtain elementary sulphur by the reaction of the dissolved sulphur dioxide and the hydrogen sulphide, maintaining an excess of hydrogen sulphide over that needed for the reaction in the reaction zone, separating the aqueous slurry of sulphur and the residual gas from the reaction mixture, returning the residual gas to the combustion zone and removing the sulphur from the aqueous slurry.

4. Process according to claim 3 in which a combustion is carried out under a gauge pressure of from 5 to 30 pounds per square inch.

5. Process according to claim 3 in which combustion gases are cooled to a temperature of below about 120° F. before the absorption.

6. Process according to claim 3 in which the reaction zone is held under a lower pressure than the combustion zone.

JOSEPH W. HARRELL.